N. WAING.
LOCK.
APPLICATION FILED NOV. 20, 1911.

1,060,960.

Patented May 6, 1913.

2 SHEETS—SHEET 1.

Witnesses:
Max B. A. Doring
Marie A. Braun

Inventor
Nikolaus Waing
By his Attorney
L. K. Böhm

N. WAING.
LOCK.
APPLICATION FILED NOV. 20, 1911.
1,060,960.
Patented May 6, 1913.
2 SHEETS—SHEET 2.
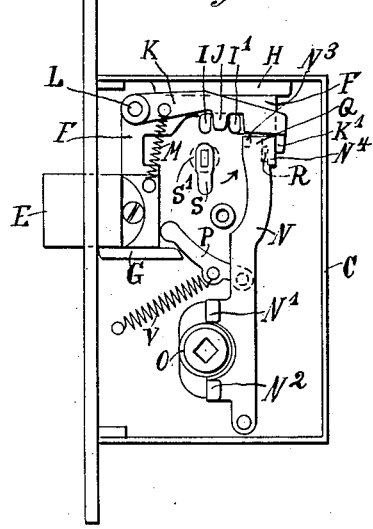
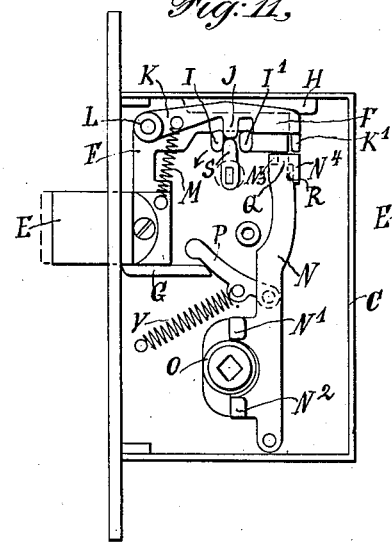
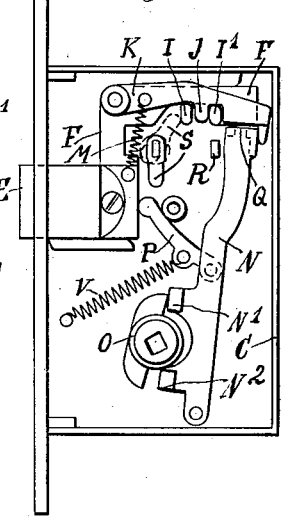
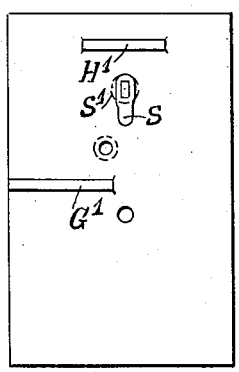
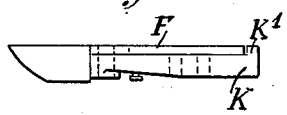
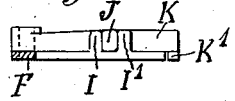
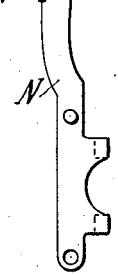
Witnesses:
Max B. A. Doring
Marie A. Braun
Inventor
Nikolaus Waing
By his Attorney
L. K. Böhm

UNITED STATES PATENT OFFICE.

NIKOLAUS WAING, OF NEW YORK, N. Y.

LOCK.

1,060,960.  Specification of Letters Patent.  Patented May 6, 1913.

Application filed November 20, 1911. Serial No. 661,318.

*To all whom it may concern:*

Be it known that I, NIKOLAUS WAING, a citizen of the Kingdom of Hungary, and a resident of New York, borough of the Bronx, county and State of New York, have invented certain new and useful Improvements in Locks, of which the following is a specification.

This invention has reference to improvements in locks and pertains particularly to safety locks to be used on house doors, inside doors, and office doors.

By virtue of the novel construction of the lock only one lock is necessary in place of two used generally on house doors. The lock may be used for both right and left hand doors, the bolt being reversible. Thus but one style of lock need be manufactured and kept in stock. The person mounting the lock simply reverses the bolt for changing the lock from a right to a left hand one, or vice versa.

For the purpose of making the lock a double one, the same is so constructed that the bolt sliding from the door into the socket of the jamb, or second half of a door, may be moved into the socket to twice the usual length by a second operation. This having been done, the large knob which can move the bolt only to the usual extent, can not open the lock. The lock can then be opened only by operating the key twice. When two locks are on a house door, necessarily two keys have to be used, while with the present lock but one key is required. The lock may also be opened from the inside by means of a stationary or removable small knob. If the small knob is removed, the key may be used. A thief entering through a window can not leave by the door unless he knows the double operation of the lock by either the small knob or the key, even if he should have either or both. If he operates the large knob alone, the door will not open, because this knob is effective only after the bolt has been moved back to the usual latching position.

Although the lock represents a double one, it is of simple construction and, therefore, relatively cheap. It is illustrated in the accompanying drawings, in which—

Figure 1:
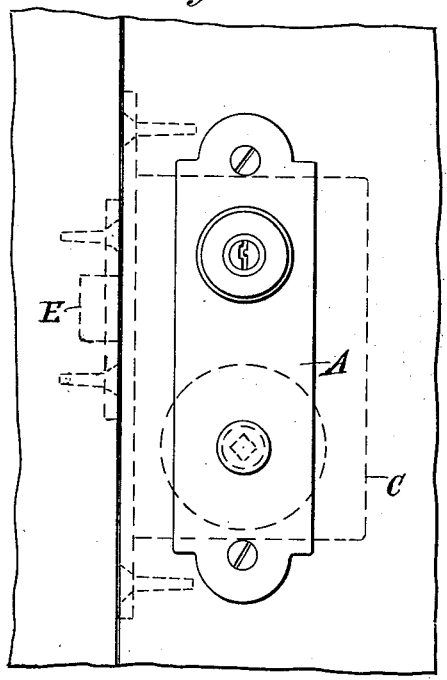
Figure 2:
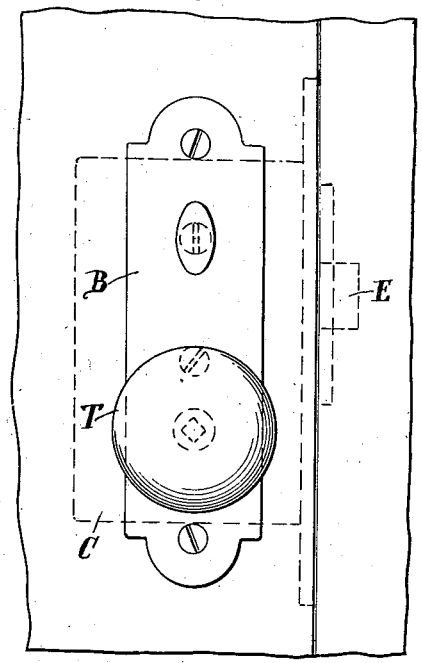
Figure 3:
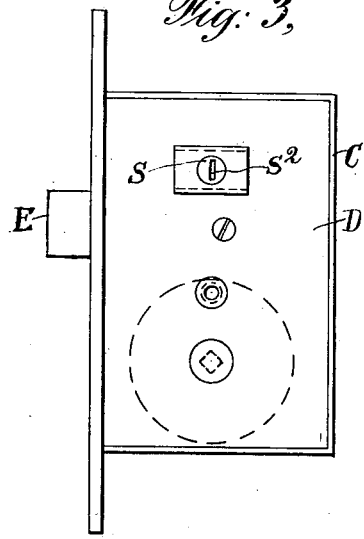
Figure 4:
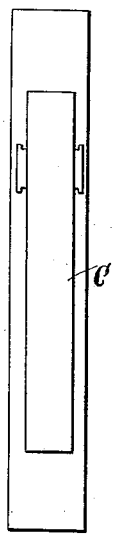
Figures 5, 6:
Figures 7, 8:
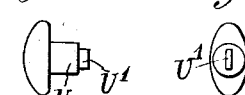
Figure 9:
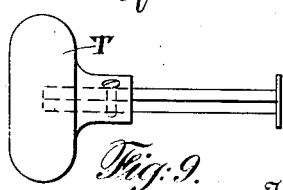

Figure 1 represents in elevation a lock embodying in desirable form the present improvements and shows the lock as applied to the door as seen from the outside. Fig. 2 is a like view seen from the inside. Fig. 3 shows the lock alone in elevation. Fig. 4 is a rear view of Fig. 3 with the large knob omitted. Fig. 5 is a side elevation of the device for inserting the key. Fig. 6 is a front elevation of the device shown in Fig. 5, as applied to the lock from the outside. Fig. 7 illustrates in side elevation the detachable small knob as used on the inside. Fig. 8 is a rear elevation of same. Fig. 9 shows in side elevation the large knob with small circular disk on one side. Fig. 10 shows the lock in side elevation with the front plate removed, the parts being shown in normal position. Fig. 11 shows the lock with the parts as they appear when the bolt has been moved to nearly its full capacity. Fig. 12 illustrates the parts as they appear when the bolt has moved out of the socket, operated by the large knob. Fig. 13 represents in rear view the plate removed from the lock. Figs. 14, 15 and 16 are detail views of several operative parts.

Similar characters of reference denote like parts in all the figures.

The lock is applied to a door in the usual way with the metal plates A, B one on the inside and one on the outside, as shown in Figs 1 and 2. These plates have openings for inserting the key in same manner as Yale locks. There is also an opening for the knob by means of which the bolt may be retracted when the safety device has not been operated.

The lock comprises a casing C with a covering plate D, a bolt E and the inside operative mechanism. The bolt E is secured to the lower end portion of a vertically extending portion of a rectangular support F which slides and is guided between the guide bars G, H within the casing. The horizontally extending portion of the support F has two noses I I' which extend at a right angle from same and are adapted to receive a similar nose J of a lever K pivoted at one end to the corner portion of the support F as at L. At its other end said lever K has a rearwardly and outwardly extending tail K' for a purpose to be stated hereinafter. The lever K is drawn downwardly by means of a spring M and rests normally against the noses of the support F.

A vertical lever N is pivoted to the lower part of the casing. It is provided with two shoulders N', N², by means of which lever may be operated by a cam O. The middle portion of the lever N has a small pivot integral therewith which supports a spring actuated lever P whose other end presses against the rear of the lower portion of the sliding support F, thereby forcing this lever and its connected parts as well as the lever N to the left. The lever N carries on its upper end two shoulders $N^3$ and $N^4$ forming a recess Q. While the shoulder $N^3$ is short, the shoulder $N^4$ is long enough to rest against a stop R on the casing, arresting thus the further movement of the lever N to the left. Below the lever K and its noses I, I', there is provided a key lever S which is brazed to a circular disk S'. The lever S is rotatably mounted in the casing and the disk S' has on its outer side a slot $S^2$ into which the end of a key or other instrument, such, for instance, as is shown in Figs. 7 and 8, may be inserted to turn the disk and thereby the key lever S. When said key lever S is turned in the direction of the arrow shown in Fig. 10, it first raises the nose J and thereby the lever K high enough to allow the tail K' to pass over the top portion of the lever N and the key lever S then pushes the sliding support F to the left as shown in Fig. 11. When the lever S is turned a little more in the direction of the arrow, the sliding support F with the bolt E carried thereby is pushed a little more to the left into the position shown in dotted lines in Fig. 11. At this moment the lever S has left the space formed by the noses I, I', and allows the lever K to drop into its normal position. The lever K has now been moved to the left as far as it can possibly move and the tail piece K' drops into the recess Q between the noses $N^3$, $N^4$, and in front of the small stop R whereby all the levers are arrested. In this position the vertical lever N can not be moved to the right because its shoulder $N^3$ is now in front of the tail-piece K', which in turn is prevented from moving rearwardly by the stop R.

When the bolt has assumed the above described position, the lock acts as a safety lock because the door can not be opened except by the use of a key or a little knob U which is provided with extensions U' that fit into the slot $S^2$ of the disk S' to which the key lever S is attached. It is evident from the above that it requires two operations of the key to open the door. The first operation brings the bolt into the position shown in Fig. 10 and the second operation into the position shown in Fig. 12, when, by a slight further movement of the key, the door can be opened. The key may be used from the inside of the door also, but only someone knowing the construction of the lock will be able to open the door, because a person not acquainted with the construction will not attempt to operate the key twice, and, therefore, can not open the door. If a thief, for instance, enters through a window, he can not open the door and pass out by the stairs or roof, but must also leave by the window, exposed to view.

The small knob U above mentioned may be permanently secured to the door on the inner side or it may be detachably mounted. It operates like the key and when turned to the right it moves the key lever in the direction opposite to the arrow in Fig. 11 and lifts the lever K whereby the tail-piece K' is released from the recess Q and passes away from the front of the stop R until it snaps in behind the lever N. Now all the parts are again in the position shown in Fig. 10. In turning the key lever a second time by the small knob U from the inside or by a key from the outside, the lever S will come in contact with the shoulder I of the sliding support F and push the bolt E to the right. Now the door may be opened and the parts are in the position indicated by dotted lines in Fig. 12. When the lock is opened from the inside by means of the small knob as described, the vertical lever N of course remains in its normal position as shown in Fig. 11.

For convenience sake a large knob is used on the inside which, however, can be operated only after the bolt has been returned to the position shown in Fig. 10, i. e., after the first operation of the key or small knob. In this instance, the bolt is moved by the lever N and the large knob T may be turned either to the right or left as required. This knob presses one of the edges of the cam O against the respective shoulder N' or $N^2$ of the lever N thereby forcing the latter to the right as shown in Fig. 12, and as the tail-piece K' of the lever K is in front of the lever N, it is moved thereby. For the purpose of drawing these parts back into the normal position, a spring V is provided on the lever P, which is pivotally mounted on the lever N.

The device W with the key-hole may be attached on either side of the lock casing and the bolt reversed as above mentioned, so that the lock may be used as a right or left hand one. The large knob T is so constructed that it may be inserted from each side into the lock. In this manner the lock may be applied to any kind of door, right or left handed, and it makes no difference whether the door swings to the outside or the inside.

I claim as my invention:—

1. A double safety lock for doors comprising a casing with guides in its upper portion, a reversible bolt sliding on one guide, a rectangular support directly connected to said bolt with a horizontal portion sliding in the second guide, a lever pivoted to the corner of said support, coöperating downwardly extending noses on said support and lever, a spring mounted directly on said lever and bolt, a tail-piece at the end of said lever, means for operating said noses to move the bolt to its usual extent, and means engaging the tail-piece of the lever to further move the bolt to double the usual extent.

2. A double safety lock for doors comprising a casing with guides in its upper portion, a reversible bolt sliding on one guide, a rectangular support directly connected to said bolt with a horizontal portion sliding in the second guide, a lever pivoted to the corner of said support, coöperating downwardly extending noses on said support and lever, a spring mounted directly on said lever and bolt, a tail-piece at the end of said lever, a cam operated vertical lever pivotally mounted in the bottom portion of the casing resting with its top end against the tail-piece and adapted to operate the bolt after the same has been moved to the usual extent, and a spring returning said vertical lever to its normal position.

3. In a double safety lock, a casing, guides in its upper portion, a reversible bolt sliding on one guide, a rectangular support directly on the inner portion of the bolt with a horizontal portion sliding in the second guide, two downwardly extending noses on the latter, a horizontal lever pivoted to the corner of the support having a nose located between the noses of the support, a spring secured to said lever and the bolt, and means for operating said noses to move the bolt to double the usual extent in either direction.

4. In a double safety lock for doors inner active mechanism for moving the bolt to twice the usual extent comprising a tail piece on one member of said inner mechanism, a cam operated vertical lever pivotally mounted in the lower portion of the casing resting with its top portion against the tail-piece when the bolt is moved to its usual extent and adapted to operate the latter for opening the door, two projections in the top portion of said vertical lever forming a recess into which the tail-piece drops when the bolt has been moved to twice the usual extent, a spring returning the said lever into its normal position, and a small stop on the casing limiting the action of said spring.

5. In a double safety lock for doors a cam operated vertical lever pivotally mounted in the lower portion of the casing and adapted to be moved by a knob said lever having two projections on its top portion which form a recess, a shoulder adjoining the projections, a stop in the casing limiting the movement of said lever, a curved arm movable on the cam operated lever and resting against the rear surface of the bolt when same is moved out to the usual extent, and a spring connected to said arm and the casing drawing said lever and said curved arm normally toward the bolt.

6. In a double safety lock for doors, a bolt, means for moving said bolt to the usual extent, a cam operated vertical lever with two shoulders on its lower portion, a knob adapted to be turned either to the right or left and pressing one of the edges of the cam against one shoulder of the lever, and a small spring pressed lever pivotally secured to the vertical lever pressing with its other end against the rear end of the bolt.

Signed at New York, N. Y., this 18th day of November, 1911.

NIKOLAUS WAING.

Witnesses:
MARIE A. BRAUN,
MARIE H. LEHR.